US011296892B2

(12) United States Patent
Kludy et al.

(10) Patent No.: US 11,296,892 B2
(45) Date of Patent: Apr. 5, 2022

(54) SECURE INTER-SERVICE COMMUNICATIONS IN A CLOUD COMPUTING SYSTEM

(71) Applicant: Citrix Systems, Inc., Fort Lauderdale, FL (US)

(72) Inventors: Thomas Kludy, Fort Lauderdale, FL (US); Leo C. Singleton, IV, Fort Lauderdale, FL (US); Felipe Leon, Fort Lauderdale, FL (US); Luis G. Menchaca, Fort Lauderdale, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 218 days.

(21) Appl. No.: 16/688,459

(22) Filed: Nov. 19, 2019

(65) Prior Publication Data

US 2020/0092109 A1    Mar. 19, 2020

Related U.S. Application Data

(63) Continuation of application No. 15/681,535, filed on Aug. 21, 2017, now Pat. No. 10,523,442.

(51) Int. Cl.
*H04L 29/06* (2006.01)
*H04L 9/32* (2006.01)
*G06F 7/58* (2006.01)

(52) U.S. Cl.
CPC ............ *H04L 9/3247* (2013.01); *H04L 9/321* (2013.01); *H04L 9/3249* (2013.01); *H04L 9/3268* (2013.01); *H04L 9/3297* (2013.01); *G06F 7/582* (2013.01)

(58) Field of Classification Search
CPC ..... H04L 9/3247; H04L 9/321; H04L 9/3249; H04L 9/3268; H04L 9/3297; G06F 7/582
See application file for complete search history.

(56) References Cited

U.S. PATENT DOCUMENTS

| | | | |
|---|---|---|---|
| 5,396,558 A | | 3/1995 | Ishiguro et al. |
| 5,765,173 A | * | 6/1998 | Cane ................... G06F 11/1453 707/640 |
| 6,961,849 B1 | | 11/2005 | Davis et al. |
| 7,251,730 B2 | | 7/2007 | Rose et al. |
| 8,799,641 B1 | | 8/2014 | Seidenberg et al. |
| 9,391,782 B1 | | 7/2016 | Mironenko |

(Continued)

FOREIGN PATENT DOCUMENTS

| | | | | |
|---|---|---|---|---|
| CN | 101394399 A | * | 3/2009 | ............. H04L 63/12 |
| CN | 111611624 A | * | 9/2020 | |

*Primary Examiner* — Shawnchoy Rahman
(74) *Attorney, Agent, or Firm* — Fox Rothschild, LLP; Robert Sacco; Carol Thorstad Forsyth

(57) ABSTRACT

Secure communications between services or components of a cloud computing system, are facilitated by generating at a first service provided by a first computing entity of a cloud computing system, a request for computing resources, generating at the first computing entity a digital data signature based at least on the request, using a private key associated with the first service; and inserting the digital data signature within an HTTP header associated with the request. A computer data network is used to communicate the request to a second service. The second service extracts the digital data signature and uses a public key to validate the digital data signature.

9 Claims, 4 Drawing Sheets

(56) References Cited

U.S. PATENT DOCUMENTS

| | | | |
|---|---|---|---|
| 9,559,849 B1 | 1/2017 | Wasiq et al. | |
| 9,800,568 B1 * | 10/2017 | Moses | H04L 63/0823 |
| 10,277,406 B1 | 4/2019 | Veladanda et al. | |
| 2002/0124172 A1 | 9/2002 | Manahan | |
| 2002/0184217 A1 * | 12/2002 | Bisbee | H04L 63/123 |
| 2006/0101285 A1 * | 5/2006 | Chen | H04L 63/08 |
| | | | 713/193 |
| 2007/0118899 A1 * | 5/2007 | Sridhar | H04B 1/0003 |
| | | | 726/22 |
| 2012/0117626 A1 | 5/2012 | Yates et al. | |
| 2012/0124384 A1 | 5/2012 | Livni et al. | |
| 2013/0128883 A1 | 5/2013 | Lawson et al. | |
| 2016/0269184 A1 * | 9/2016 | VanBlon | H04L 9/3263 |
| 2017/0054736 A1 * | 2/2017 | Krishnamurthy | H04L 63/123 |
| 2019/0140837 A1 | 5/2019 | Cheng et al. | |

* cited by examiner

SECURE INTER-SERVICE COMMUNICATIONS IN A CLOUD COMPUTING SYSTEM

BACKGROUND OF THE INVENTION

Statement of the Technical Field

The present disclosure relates generally to cloud computing systems. More particularly, the present invention relates to implementing systems and methods for authentication in a cloud environment that enables enhanced security.

DESCRIPTION OF THE RELATED ART

Cloud computing allows a user to utilize applications or services running on a remotely located computer rather than on the user's local computer. For example, data may be processed in the cloud by forwarding the data from a client computer to a server computer, where the data is processed before returning the processed data back to the client computer. In some scenarios, the computing resources generally allow for the operating systems, applications, and user settings of multiple users to be included on a single physical machine.

In some instances, a cloud services provider may create a set of server farms so that each server farm includes a separate and isolated hosting infrastructure to serve one or more tenants of the cloud services provider. Individual server farms may host multiple tenants and may be generally configured to support the computing needs of those tenants. Other server farms may be used exclusively by one tenant, for example, a large scale or highly secure customer, and may be specifically configured based on the needs of that single tenant.

Conventional cloud systems usually need to support inter-service communications between the many services and components that comprise the cloud system. These components can include tenant platforms components comprised of connectors, fat clients, thin clients, mobile devices and so on. They can also include back end platforms such as servers, storage devices and so on. They can further include virtual machines hosted by such back end platforms.

Cloud computing systems can utilize one or more Cloud Application Programming Interfaces (Cloud APIs) to facilitate provisioning of cloud components and services, including cloud hardware, software, and platforms. In this regard, it is well-known that cloud APIs can facilitate the necessary gateway or interface functions for cloud infrastructure and software services. Such APIs can greatly facilitate integration of cloud services and component within the cloud environment.

For example, a cloud API in one computing service or component can interact with a cloud infrastructure (e.g., appliances, servers, storage devices, and/or connectors) using HTTP requests to facilitate use of certain computing, storage, and network resources which are needed for implementing cloud services. Various type of conventional cloud APIs can be used for this purpose, depending on the particular cloud service or solution. The service requests (i.e., an API request) generated by such cloud APIs will generally include information specifying a Uniform Resource Locator (URL) of the particular computing entity resource from which services are requested. For example, infrastructure APIs can facilitate use of basic computing and storage capabilities. Alternatively, if the cloud computing system is configured to offer a Platform as a Service (PaaS), then certain platform APIs can be used to facilitate a back-end cloud infrastructure associated with such platform. Similarly, software or application type cloud APIs can be used to facilitate interaction with hardware and software entities which facilitate Software as a Service (SaaS) in a cloud computing environment.

In the context of such inter-service communications, a server which receives an API request can identify the client which made such request. A conventional approach to such problem involves SSL client certificates. But SSL client certificates are notoriously difficult to manage. They have expiration times, they require setting up of trust chains, and they do not support communications through any type of SSL web proxy. Another approach to this problem involves the use of a pre-shared secret as is used in AWS (Amazon Web Services). In those systems, the client and server both have accessed to a shared secret key. But this approach is problematic. If the server has the same key as the client, then the server can impersonate the client if the server itself has been compromised. AWS also lacks any type of anti-replay mechanism within the API request so it is potentially subject to replay attacks.

SUMMARY OF THE INVENTION

The solution disclosed herein concerns a method and system to support secure communications between services or components of a cloud computing system. The method involves generating a request at a first computing service provided by a first computing entity of the cloud computing system. The request is for certain computing resources which are available or provided by a second computing service at a second computing entity of the cloud computing system which is capable of providing the computing resources. In some scenarios, the request is generated at the first computing entity by means of a cloud Application Programming Interface (API). A digital data signature is generated at the first computing entity based at least on the request, and by using a private key associated with the first computing service. In certain scenarios described herein, the digital data signature can be generated using one or more algorithms selected from the group consisting of an RSA encryption algorithm and one of the SHA-2 family of hashing algorithms.

The digital data signature is inserted within an HTTP header associated with the request. Thereafter, the request is communicated from the first computing service to the second network, using a computer data network. At the second computing entity, the HTTP header is parsed to extract the digital data signature and a public key is used to validate the digital data signature. Thereafter, the second computing service will selectively comply with the request only if the digital data signature is determined to be valid.

In some scenarios, the method further involves generating at the first computing service a pseudorandom nonce value, and communicating the pseudorandom nonce value to the second service together with the request. In such scenarios, the digital data signature is further based on the nonce value. A timestamp value can also be determined or generated at the first computing entity. For example, the timestamp value can correspond to a date and time when the request was generated. When a timestamp value has been provided in this way, the digital data signature is advantageously also based on the timestamp value.

Further signature version information can be communicated with the request. The signature version information can specify a particular version of the signature that was used at the first computing service to generate the request signature. After the request is received at the second computing entity, it can be communicated to a central Trust authority server to retrieve information specifying one or more signature versions which are supported or permitted. The second computing system can utilize information received from the central Trust authority to determine whether the signature version information included with the request corresponds to a signature version that is permitted. Further, the second computing service can communicate with a central Trust authority server to retrieve the public key.

This disclosure also concerns a cloud computing system which supports secure communications between services or components thereof. A first computing service can be provided by a first computing entity of a cloud computing system. The first computing entity can provide access to a cloud Application Programming Interface (API) to facilitate generating a request for computing resources. For example, the request can be addressed to a second computing service provided by a second computing entity comprised of at least a second electronic circuit of the cloud computing system which can provide the computing resources. In such scenarios, one or more components of the first computing entity are configured to generate a digital data signature based at least on the request, using a private key associated with the first service. The first computing entity is further configured to insert the digital data signature within an HTTP header associated with the request, and thereafter use a computer data network to communicate the request to the second computing service. The second computing service is configured to parse the HTTP header to extract the digital data signature and use a public key to validate the digital data signature. Moreover, the second computing service is configured to comply with the request only if the digital data signature is determined to be valid.

BRIEF DESCRIPTION OF THE DRAWINGS

Embodiments will be described with reference to the following drawing figures, in which like numerals represent like items throughout the figures, and in which.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

The present disclosure concerns cloud computing systems which support secure inter-service communications between while also providing a means to identify caller entities that have generated an API request. These features are facilitated by using signed API requests. The signed API requests allow secure communications between two or more cloud components or services while also providing the means to identify a caller (i.e., a computing entity which has initiated a communication or API request). These signed API requests use a Central Authority where cloud systems can register a public key (e.g., an RSA public key) for each of its services or components that will engage in inter-service communications in a secure manner. Once registered, callers can use their private key to generate a signature for a target API request. The callee (the computing entity receiving the communication or API request) can then use such signature to validate the communication using the corresponding registered, public key (e.g., an RSA key). The registered keys can be associated with a single entity or multiple entities in the system. The signatures described herein are exchanged between the caller and the callee via HTTP headers, along with the signature version. In some scenarios, the callee entity can be advantageously configured to enforce expiration and anti-replay logic, which can be as strict or relaxed as needed.

Figure 1:
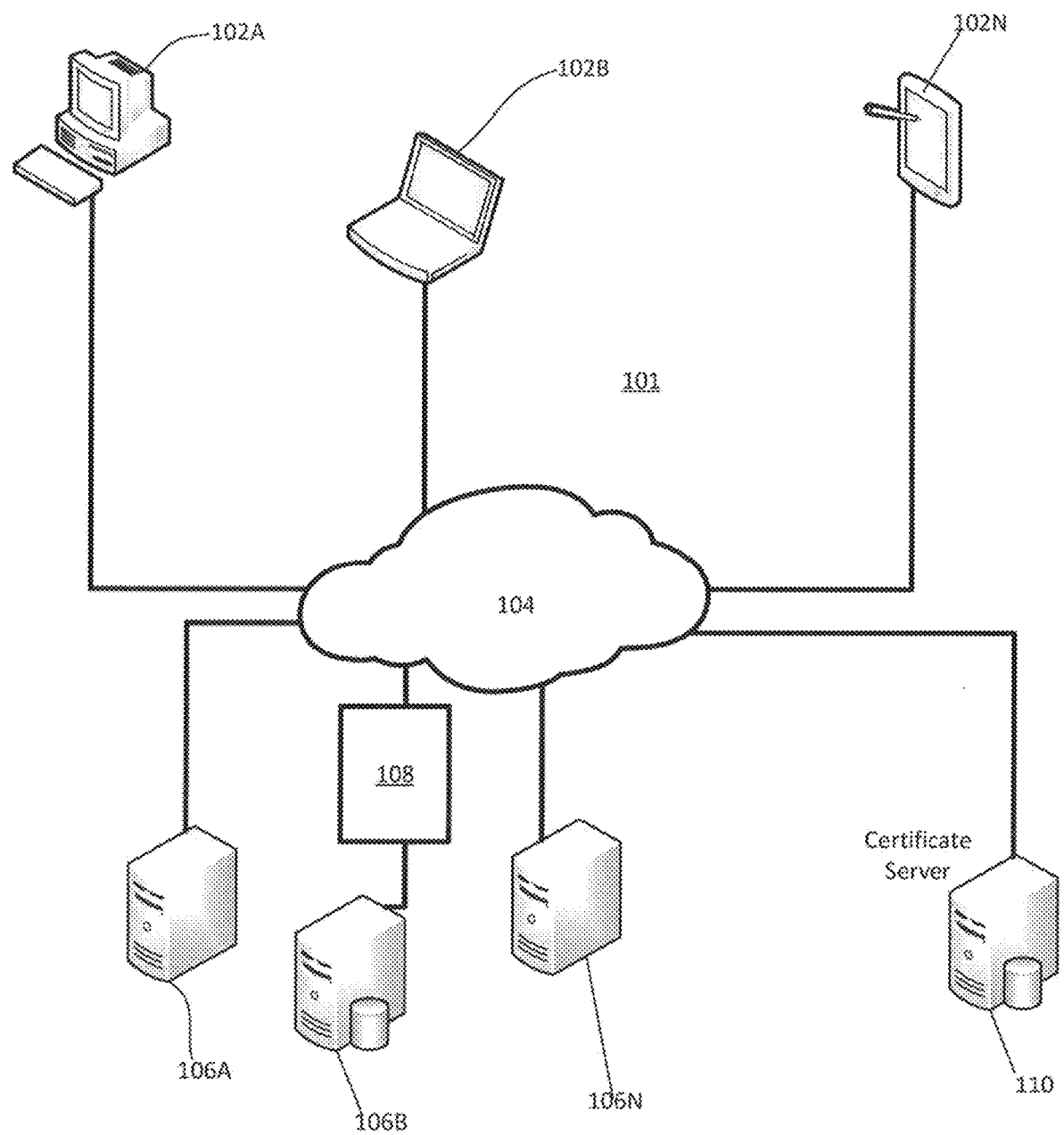
FIG. 1 is a block diagram that is useful for understanding a cloud computing system.

Referring now to FIG. 1 there is illustrated a block diagram which is useful for understanding certain aspects of a system and method for secure inter-service communications in a cloud computing system. Computing environment 101 can include one or more client machines 102A-102N (generally referred to herein as "client machine(s) 102A-N") in communication with one or more servers 106A-106N (generally referred to herein as "server(s) 106A-N"). Installed in between the client machine(s) 102A-N and server(s) 106A-N is a network 104.

In some scenarios, the computing environment 101 can include an appliance (not shown here) that is installed between the server(s) 106A-N and client machine(s) 102A-N. This appliance may manage client/server connections, and in some cases can load balance client connections amongst a plurality of backend servers. For example, the appliance may be a cloud management server and/or a cloud connector 108 that may provide a communication link between the client machine(s) 102A-N and the server(s) 106A-N for accessing computing resources (cloud hardware and software resources) hosted by the server(s) 106A-N in a cloud-based environment. The management server may run, for example, CLOUDSTACK by Citrix Systems, Inc. of Ft. Lauderdale, Fla., or OPENSTACK, among others. The cloud hardware and software resources may include private and/or public components. For example, a cloud may be configured as a private cloud to be used by one or more particular customers or client computers and/or over a private network. In other scenarios, public clouds or public-private clouds may be used by other customers over open or closed networks.

The client machine(s) 102A-N can be referred to as a single client machine or a single group of client machines, while server(s) 106A-N may be referred to as a single server or a single group of servers. In some scenarios, a single client machine communicates with more than one server, while in another scenario a single server communicates with more than one client machine. In yet another scenario, a single client machine communicates with a single server.

Client machine(s) 102A-N can, in some embodiments, be referenced by any one of the following terms: client machine(s); client(s); client computer(s); client device(s); client computing device(s); local machine; remote machine; client node(s); endpoint(s); endpoint node(s); or a second machine. The server(s) 106A-N, in some embodiments, may be referenced by any one of the following terms: server(s), local machine; remote machine; server farm(s), host computing device(s), or a first machine(s).

In some scenarios, one or more of the client machine(s) 102A-N can comprise a virtual machine. The virtual machine can be any virtual machine, while in some embodiments the virtual machine can be any virtual machine managed by a hypervisor developed by XenSolutions, Citrix Systems, IBM, VMware, or any other hypervisor. In other embodiments, the virtual machine can be managed by any hypervisor, while in still other embodiments, the virtual machine can be managed by a hypervisor executing on a server or a hypervisor executing on a client machine.

The client machine(s) 102A-N can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still in other scenarios one or more client machine(s) 102A-N display application output generated by an application remotely executing on a server(s) 106A-N or other remotely located machine. In such instances, the client machine(s) 102A-N can display the application output in an application window, a browser, or other output window. According to one aspect, the application is a desktop, while in other scenarios the application is an application that generates a desktop.

The server(s) 106A-N can execute a remote presentation client or other client or program that uses a thin-client or remote-display protocol to capture display output generated by an application executing on a server and transmit the application display output to a remote client machine(s) 102A-N. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment 101 can include more than one server(s) 106A-N such that the server(s) 106A-N are logically grouped together into a server farm. The server farm can include servers that are geographically dispersed and logically grouped together in a server farm, or servers that are located proximate to each other and logically grouped together in a server farm. Geographically dispersed servers within a server farm can, in some scenarios, communicate using a WAN, MAN, or LAN, where different geographic regions can be characterized as: different continents; different regions of a continent; different countries; different states; different cities; different campuses; different rooms; or any combination of the preceding geographical locations. According to one aspect, the server farm may be administered as a single entity, while in other scenarios the server farm can include multiple server farms.

A server farm as described herein can include server(s) 106A-N that execute a substantially similar type of operating system platform (e.g., WINDOWS NT, manufactured by Microsoft Corp. of Redmond, Wash., UNIX, LINUX, or SNOW LEOPARD.) Alternatively, the server farm can include a first group of servers that execute a first type of operating system platform, and a second group of servers that execute a second type of operating system platform. The server farm, in some scenarios can include servers that execute different types of operating system platforms.

The server(s) 106A-N, can be any server type. For example, a server can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server executing an active directory; or a server executing an application acceleration program that provides firewall functionality, application functionality, or load balancing functionality. In some scenarios, a server may be a RADIUS server that includes a remote authentication dial-in user service. In those scenarios where the server comprises an appliance, the server can be an appliance manufactured by any one of the following manufacturers: the Citrix Application Networking Group; Silver Peak Systems, Inc; Riverbed Technology, Inc.; F5 Networks, Inc.; or Juniper Networks, Inc.

According to one aspect a first server 106A can receive requests from one or more client machine(s) 102A-N, forward the request to a second server 106B, and respond to the request generated by the client machine(s) 102A-N with a response from the second server 106B. The first server 106A can acquire an enumeration of applications available to the client machine(s) 102A-N and well as address information associated with an application server hosting an application identified within the enumeration of applications. The first server 106A can then present a response to the client's request using a web interface, and communicate directly with the client machine(s) 102A-N to provide the client machine(s) 102A-N with access to an identified application.

In some scenarios, the server(s) 106A-N can execute any one of the following applications: a thin-client application using a thin-client protocol to transmit application display data to a client; a remote display presentation application, or the like. Another scenario includes a server that is an application server such as: an email server that provides email services such as MICROSOFT EXCHANGE manufactured by the Microsoft Corporation; a web or Internet server; a desktop sharing server; a collaboration server; or any other type of application server. Still other scenarios may involve a server that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machine(s) 102A-N can, in some embodiments, be a client node that seek access to resources provided by a server. In other scenarios, the server(s) 106A-N may provide client machine(s) 102A-N with access to, hosted resources. A server(s) 106A-N, can function as a master node such that it communicates with one or more client machine(s) 102A-N or server(s) 106A-N. The master node can identify and provide address information associated with a server hosting a requested application, to one or more clients or servers. In still other instances, the master node can be a server farm, a client machine, a cluster of client nodes, or an appliance.

One or more client machine(s) 102A-N and/or one or more server(s) 106A-N can transmit data over network 104 installed between machines and appliances within the computing environment 101. The network 104 can comprise one or more sub-networks, and can be installed between any combination of the client machine(s) 102A-N, server(s) 106A-N, computing machines and appliances included within the computing environment 101. In some scenarios, the network 104 can be: a local-area network (LAN); a metropolitan area network (MAN); a wide area network (WAN); a primary network comprised of multiple sub-networks located between the client machines 102A-N and the servers 106A-N; a primary public network with a private sub-network; a primary private network with a public sub-network 4; or a primary private network with a private sub-network. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band.

Cloud Application Programming Interfaces (APIs) can be used by the client machines 102A-N, servers 106A-N or other components of the cloud computing system to facilitate a cloud computing system as described herein. Cloud APIs are well known in the art and therefore will not be described in detail. However, it should be appreciated that such cloud APIs can be used for a variety of different purposes when implementing a cloud computing system. In some scenarios, a cloud API can be used to facilitate cloud computing models which offer Platform-as-a-Service (PaaS). These cloud API can help with integrating databases, messaging systems, communication portals, and storage devices. In the context of Software-as-a-Service (Saas), cloud APIs can be used to connect an application layer with underlying IT infrastructure. At the Infrastructure level, cloud APIs can help to facilitate access to certain cloud resources (e.g., by provisioning and de-provisioning of cloud resources). They can also be used to facilitate and control workload management. Cross-platform cloud APIs can allow cloud customers to access resources from multiple cloud providers and platforms. A request to a resource associated with a client machine(s) 102A-N, or server(s) 106A-N which is exposed via a cloud API is referred to herein as an API request.

One or more servers 110 in communication with network 104 can comprise computing entities associated with a public key infrastructure (PKI). For example, a server 110 can comprise a Certificate Server. A Certificate Server as described herein can include server(s) 110 that execute a suitable operating system platform (e.g., WINDOWS NT, manufactured by Microsoft Corp. of Redmond, Wash., UNIX, or LINUX). The function of the Certificate Server 110 will be described below in greater detail as the discussion progresses.

The network topology of the network 104 can differ within different contexts. Possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 2:
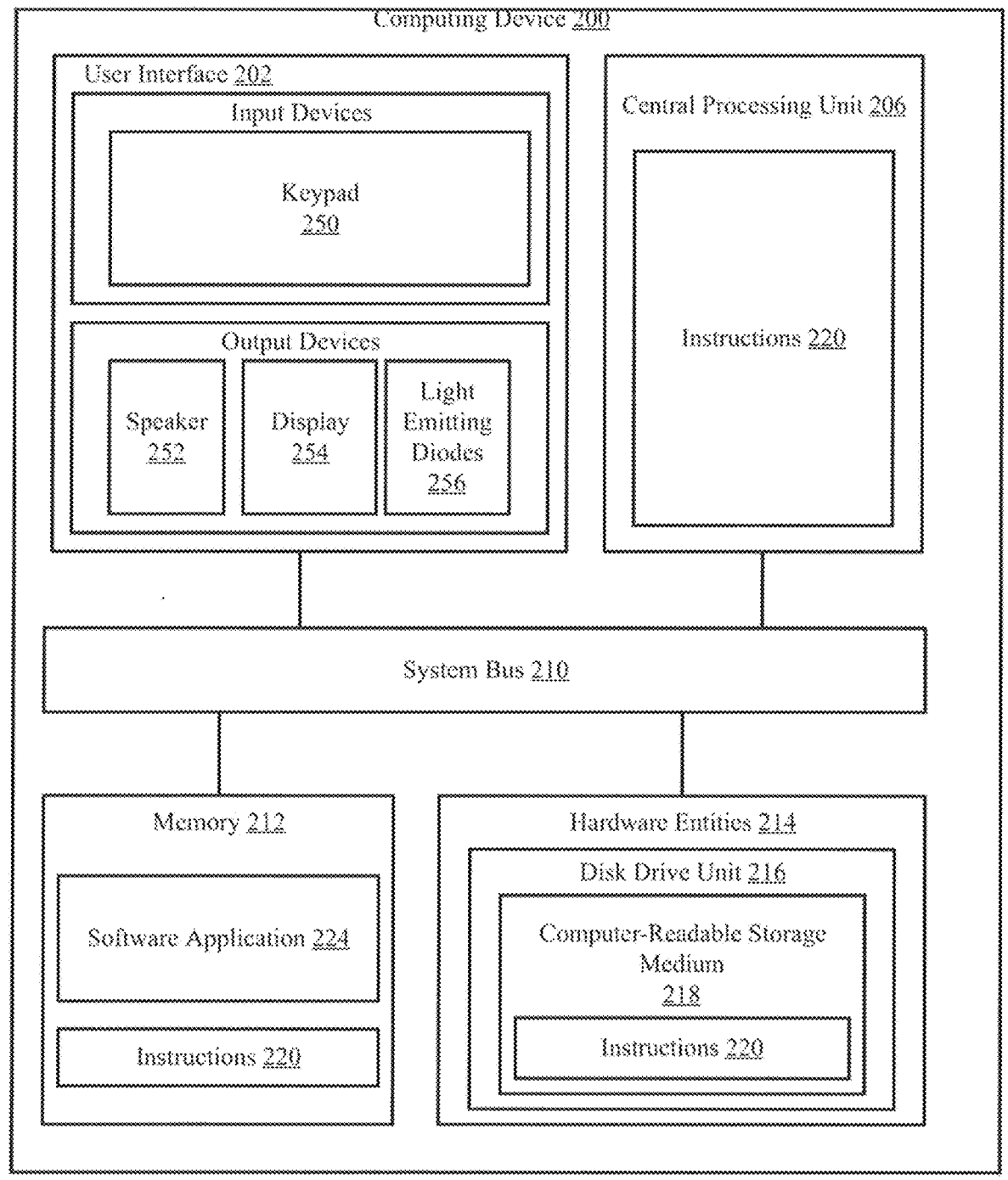
FIG. 2 is a block diagram that is useful for understanding one or more of the computing entities shown FIG. 1.

Referring now to FIG. 2, there is provided a detailed block diagram of an exemplary architecture for a computing device 200, where the client machine(s) 102A-N, server(s) 106A-N, connector 108, and Certificate Server 110 illustrated in FIG. 1 can be deployed as and/or executed on any variation of the computing device 200. As such, the following discussion of computing device 200 is sufficient for understanding client machine(s) 102A-N server(s) 106A-N, connector 108 and/or server 110 of FIG. 1.

Computing device 200 may include more or less components than those shown in FIG. 2. However, the components shown are sufficient to disclose an illustrative computing device for implementing the present solution. The hardware architecture of FIG. 2 represents one example of a representative computing device configured to facilitate storage and/or transmission of sensitive information in a cloud computing environment. As such, the computing device 200 of FIG. 2 implements at least a portion of a method for secure inter-service communications as described herein.

Some or all the components of the computing device 200 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 2, the computing device 200 comprises a user interface 202, a Central Processing Unit ("CPU") 206, a system bus 210, a memory 212 connected to and accessible by other portions of computing device 200 through system bus 210, and hardware entities 214 connected to system bus 210. The user interface can include input devices (e.g., a keypad 250) and output devices (e.g., speaker 252, a display 254, and/or light emitting diodes 256), which facilitate user-software interactions for controlling operations of the computing device 200.

At least some of the hardware entities 214 perform actions involving access to and use of memory 212, which can be a RAM, a disk driver and/or a Compact Disc Read Only Memory ("CD-ROM"). Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the computing device 200. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 222 for execution by the computing device 200 and that cause the computing device 200 to perform any one or more of the methodologies, as described herein.

The hardware and software entities in computing device 200 can comprise one or more cloud APIs which facilitate inter-service requests for cloud-based resources. For example, the hardware entities 214 can include an electronic circuit (e.g., a processor) programmed with instructions 220 which implements a cloud API. In this regard, it should also be understood that the electronic circuit can access and run one or more software applications 224 installed on the computing device 200. The functions of the software application 224 and the cloud APIs will become apparent as the discussion progresses.

As is known, public key cryptography uses pairs of keys which include a public key (that is publicly accessible) and a private key that is known only to the computing entity or service that owns the key. The private key is kept secret by the computing entity that owns the key and can be used advantageously to create an encrypted digital signature. The digital signature is comprised of an encrypted block of data. The data is encrypted with the private key before is it communicated to a recipient. When received, the recipient uses the public key to decrypt the digital signature, and thereby authenticate the identity of the sender.

To create the digital signature, signing software at the sending entity can create a one-way hash of the electronic data to be signed. A one-way hash function which can be used for this purpose can include any suitable hash function. For example, any one of the well-known family of SHA hash functions including SHA-224, SHA-256, SHA-384 AND SHA-512 (collectively known as SHA-2) can be used for this purpose. The value of the hash will uniquely correspond with the hashed data, but the original data cannot be determined from the hash. Any attempts to modify the data will necessarily result in a different hash value when the hash function is applied to the data. Accordingly, the integrity of the data can be established by at a receiving entity by (1) using the signer's public key to decrypt the hash, (2) computing the hash value of the received data using the same hash function, and (3) comparing to the computed hash value determined at the receiving entity to the decrypted version of the hash communicated by the sender. If the two hash values fail to match, the recipient will know that the data has been modified or the signature was created with a private key that doesn't correspond to the public key presented by the signer. Note that the hash value is encrypted rather than the entire message or request because the hash comprises much less data.

The public key approach to securing data is well known in the art and therefore will not be described here in detail. However, it will be appreciated that implementation of public/private key authentication methods will advantageously include some means of validating that the public key in use by a recipient is valid. Otherwise, a fraudulent entity could provide a recipient with a forged public key. This validation function is facilitated by a trusted entity such as a Certificate Authority (CA). Within the context of public key cryptography, a digital certificate is understood to comprise a formatted data file that binds a particular public key to an organization, person or service. A trusted CA will create a digital certificate as described herein and will digitally sign it by utilizing the private key of the CA. A recipient can then use the public key of the CA to verify that the provided certificate and public key are in fact valid.

In the cloud computing system 101, the Certificate Server 110 performs functions of a CA as described herein. In this regard it should be understood that the Certificate Server can be a component of a PKI which includes one or more servers which operate under the control or authority of a trusted entity. In addition to issuing certificates, these servers can comprise administrative software associated with the CA to register computing entities or cloud services, provide certificates to authorized entities, and revoke certificates when necessary. In some scenarios, the Certificate Server 110 can also time stamp each certificate, and update certificates as needed. The Certificate Server 110 can also control access to a certificate repository.

In the cloud computing environment shown in FIG. 1, one or more of the client machine(s) 102A-N or server(s) 106A-N may comprise services or components associated with the cloud computing platform 101. These services can comprise any functional computing activities implemented by any one or more of the client machine(s) 102A-N or server(s) 106A-N. which facilitate the computing operations performed with the cloud computing system. As such, various communications may be necessary between one or more of the components of the cloud computing system. In some scenarios, these communications will involve cloud API requests from one computing entity to another such entity within the context of the cloud computing network. For example, the communications can involve communications between one or more of the client machine(s) 102A-N, and/or server(s) 106A-N.

Within the foregoing context, the solution disclosed herein involves use of digitally signed API requests to authenticate communications between two or more cloud components or services while also providing the means to a identify a particular caller (which originated the API request). In some scenarios, these digitally signed API requests use a central Trust authority (e.g., Certificate Server 110) to facilitate control and validation of public keys.

In a solution described herein various cloud computing systems (e.g. cloud computing systems 101) can register a public key (e.g., an RSA key) for each of its services or components that should engage in inter-service communications in a secure manner. These public keys can be stored by a Certificate Server 110 or other trusted Central Authority). Once registered, caller entities which originate an API request can use their private key (e.g., a private RSA key) to generate a digital signature for a target API request. The callee entity which is the recipient of such request can validate the API request using the corresponding registered, public key.

In a scenario disclosed herein, the digital signatures are advantageously exchanged between the caller and the callee by including such information in HTTP headers. A signature version can also be advantageously included in the header. The callee entity which receives the API request can enforce expiration and anti-replay logic, which can be as strict or relaxed as needed. In the foregoing scenario, a caller entity can comprise a hardware entity such as client machine 102A-N, a server 106A-N, a cloud connector or any other type of cloud system infrastructure (e.g., appliances, servers, storage devices, and/or connectors). Likewise, a callee entity can comprise a hardware entity such as client machine 102A-N, a server 106A-N, a cloud connector or any other type of cloud system infrastructure (e.g., appliances, servers, storage devices, and/or connectors). Further, a caller or callee entity can comprise a virtual machine executing on such hardware entities. In some scenarios, a caller or callee entity can comprise a software entity, such as a particular software application executing on a hardware device.

Figure 3:
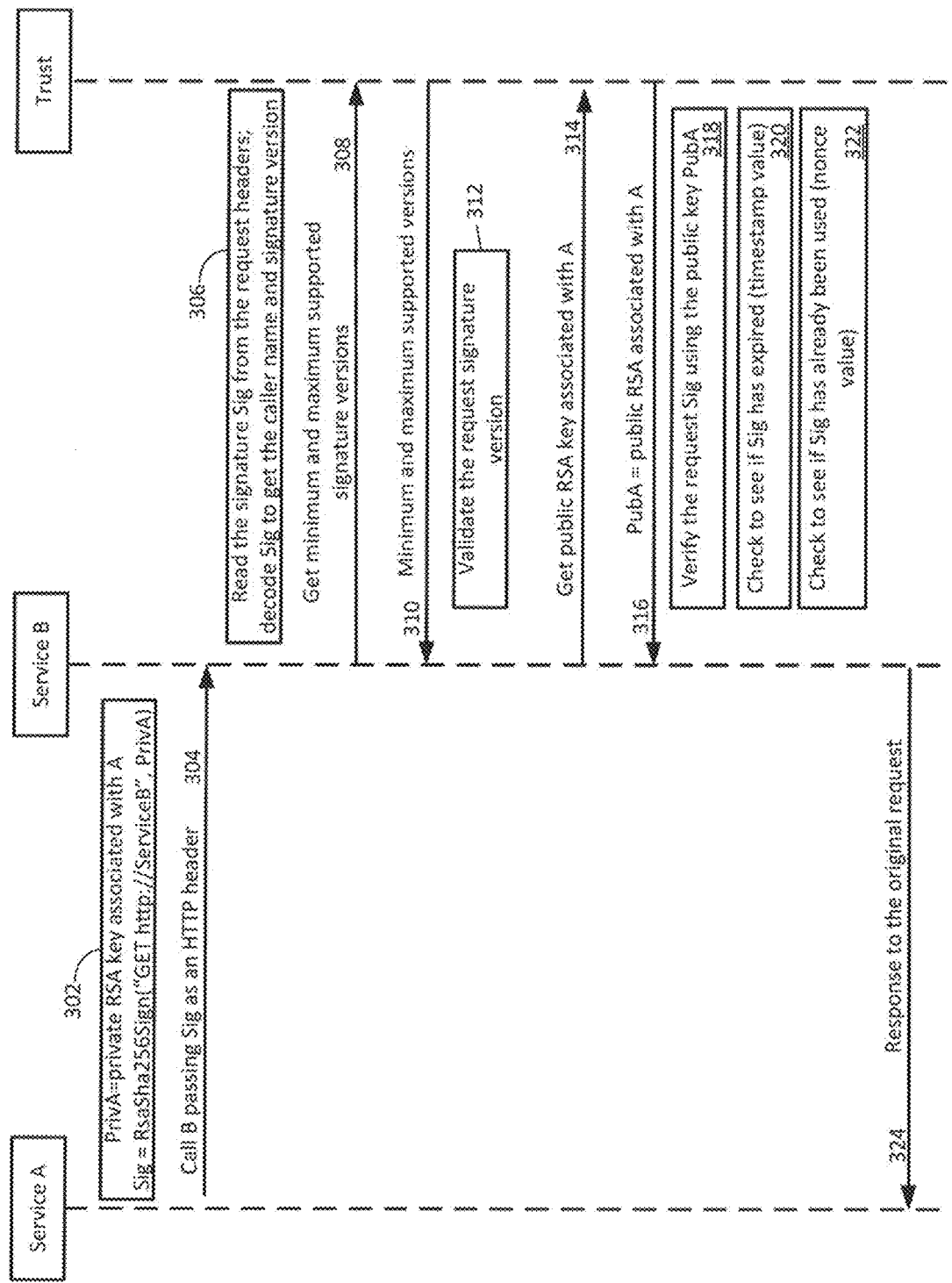
FIG. 3 is a sequence diagram that is useful for understanding a process for supporting secure inter-services communications in a cloud computing system.

The sequence diagram shown in FIG. 3 is useful for understanding the communications associated with the use of signed API requests as described herein. For purposes of this example, we can assume that Service A is associated with one of the client machines 102A-N. Similarly, we can assume that Service B is associated with one of the servers 106A-N. However, it should be appreciated that the proposed solution is not limited in this regard. As an alternative Service B could be associated with one of the client machines 102A-N and Service A could be associated with one of the servers 106A-N. Also, the sequence diagram could refer to communications between two servers or two clients. The sequence diagram could also refer to a communication session involving a cloud connector and a server 106A-N.

Each service (e.g., Service A, Service B) registers a public key (e.g., an RSA public key) with the central Trust authority (e.g. Certificate Server 110). The corresponding private key is kept secure in a data store (not shown) associated with the owner of the key (e.g., a data store associated with a client machine 102A-N, a server 106A-N, a cloud connector or any other type of cloud system infrastructure). Public keys can be registered with the Trust Authority for a specific service name (e.g. Service A, Service B) and an optional instance id value (e.g., an alpha-numeric or numeric identification value), for those scenarios where single instance versus multi-instance use of public keys is relevant.

When a given Service A needs to initiate a call (i.e., make an API request) to another Service B, the Service A will generate the API request. The request will include the caller service name and signature version information to specify a particular signature version that is in use. In this regard it will be appreciated that it may sometimes be necessary to change the information that is used for purposes of generating a digital signature as part of the signing process. It may also be necessary to change the way that the digital signature is generated. For example, instead of an RSA encryption method it may be necessary in some scenarios to switch to elliptic curve algorithm. The version information can ensure that the caller and callee are both using the same techniques and methods for generating and decoding the signature.

Service A will also generate a pseudorandom, 128 bit long nonce value. The nonce value will comprise a pseudorandom number which can be used only once to ensure that an old communication or API request cannot be reused in a replay attack. Service A can also generate a Unix timestamp corresponding to the current date and time (e.g., the time in UTC). Service A will then at 302 sign the API request, the nonce value, and the timestamp using its private RSA key PrivA, thereby generating a signature (Sig).

At 304 Service A will transmit the signed API request using the computer network (e.g. network 104) so as to communicate the API call to Service B. This call will advantageously include the signature (Sig) associated with the API request as generated at 302. The signature (Sig) is advantageously included as a part of a standard HTTP authorization header associated with the API request. When Service B receives the signed API request from Service A, it will read at 306 the signature value from the HTTP headers associated with the request. Service B will also decode the request (using the public RSA key) to read the caller service name and signature version.

At 308 Service B calls the central Trust authority (e.g., Certificate Server 110) to retrieve the minimum and maximum values of signature versions which are supported or authorized. Once this information is received at 310, Service B proceeds to validate the request signature version at 312. If the signature version in the API request is within a permissible range defined by the minimum and maximum values, then the signature version is validated and the process continues on to 314. If the signature version information is not valid for any reason, the API request can be ignored, deleted or archived by Service B for examination at a later time.

Assuming that the signature version information is valid, the process continues on to 314 where Service B calls the central Trust authority to retrieve the public RSA key associated with the caller (in this case, Service A). The public RSA key associated with Service A is received by Service B at 316. Service B then uses the public key to perform several steps. At 318 Service B will use the public key to verify the signature contained in the request. If the signature is valid, the process will continue on to 320. If the signature is not valid, then the request can be discarded, ignored or archived.

At 320, Service B can evaluate the signature timestamp value to determine whether the signature has expired. If so, the request can be discarded, ignored or archived. At 322, Service B can further check the nonce value to ensure that the signature has not already been used. This step can be performed by comparing the nonce value to a local data cache accessible to Service B which contains all nonce values previously used within a predetermined duration of time. If the comparison reveals that the nonce value has been previously used, the request can be discarded, ignored or archived. If the signature, timestamp, and nonce value are all acceptable, then the process will continue at 324 by responding to the API request. This can involve providing the requested resources, or performing other actions associated with the request.

In FIG. 3, the various signing functions performed by Service A as described herein can be performed using one or more library functions which is available within computing entity (e.g. connector computer 108 or client machine 102A-N) which hosts Service A. Similarly, the various decoding, authentication and validation functions performed by Service B can be performed using a library function which is available within the computing entity which hosts Service B (e.g. at one of servers 106A-N).

Figure 4:
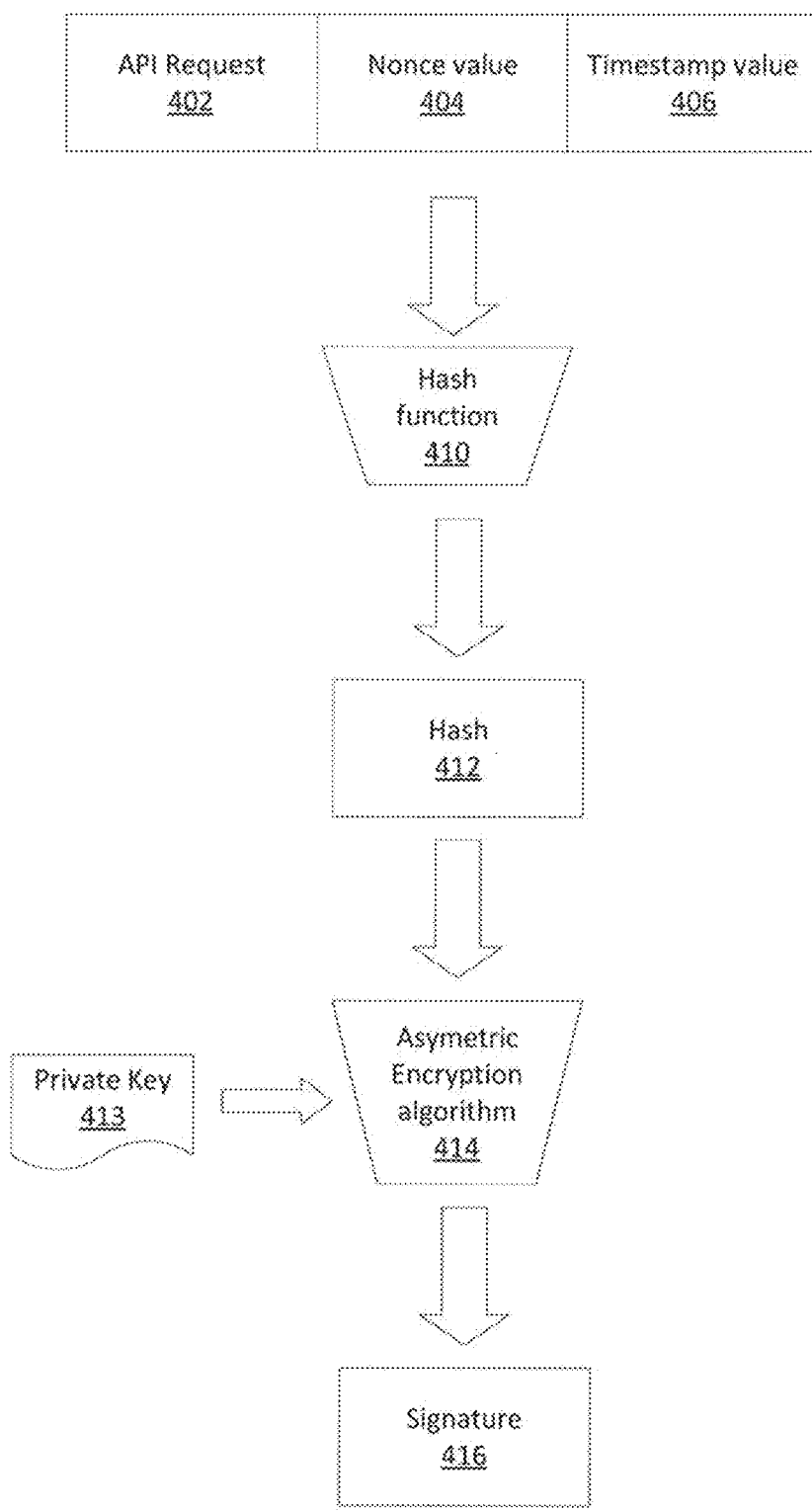
FIG. 4 is a diagram that is useful for understanding a process for generating digital data signatures as disclosed herein.

The signature generation process is shown in greater detail in FIG. 4. The API request 402, the nonce value 404, and timestamp value 406 are processed using a hash function 410 to produce a hash value 412. The hash value is then encoded using a private key 413 and asymmetric encryption algorithm 414 to generate digital data signature 416. The signature version information is advantageously excluded from the hash, and is instead included in the token (resulting service key) which is communicated in the HTTP header. So the signature version information is not included as part of the hash or the signature itself.

To more fully understand the foregoing process, consider a scenario where a target URL is https://service.ctxwsstgap-i.net/customer/endpoint?param=value. In such a scenario, the signed header and the request can appear as follows:

GET /customer/endpoint?param=value HTTP/1.1
Host: service.ctxwsstgapi.net
Authorization: CWSAuth service=
Q0MtUlNBLVNIQTI1Ni0yOzE1MDExOTE2MDA7NmE4OTBlODZm
ZTQ5ZWNmZDkyNWYyYzdlNGRlMTAzMWU7QUlkUDhXLysxVlY
vNVBHdzN2M1g3NVVXK1dxcHZsQkRzeHFYN203Tm02Y2cwcWh
PMjdPUm1IVnhaaC81U1oyN1dBa2d1ZTIzdk1JcFVZMVp4cktPOTV
uQWEzZW1jRWdkUVJvRUFGS3RId3llYjZBTWFsQjZKL1hLWUFjY
1E5Wk1Yb0N4YnZERm5MKzlNeXVEZWFtNVFGUEUycFZVS1FnS
FNkQVU3alcrVWVpRkFJZFRMZ1Q5WHh4c0NzbS95ZlBSd1ZWQ
WZuU2RrS3N4Y1pqa3J4Tjc0eGFmZmd5Z2J6NVh5WTN0VVRQO
G40YnVPR1ZJaU13NmJabzNNMmFjcXVsc1BMRnFRa1N4VGM3
MkdTckJuNEt5YmRkL2U0S3hiV0t4aHl6Nkh5dkpVU2FHcEZhcXgx

```
ejJiS1BoaHF4UngzbnZQQTVCSVgvSTVRV2FvMU1WN1NONU9R
PT07VGVzdFNlcnZpY2U =
```

In the foregoing example, the value assigned to "service" in the Authorization header listed above contains the signature. This value is in fact a compound object, a base64 encoded value that follows this structure:

```
signature = Base64(RSASignHash(SHA256(<target_url> + "\n" +
  <timestamp> + "\n" + nonce)))
key = Base64("CC-RSA-SHA256-2" + ";" + <timestamp> +
  ";" + <nonce> + ";" + signature + ";" + <service_name>
  [+ ";" + <instance_id>]))
```

The resulting key value is what is actually sent in the Authorization header of the request.

When the key value is received, it is decoded to obtain the signature version, timestamp, nonce, and so on. For example, assume that we receive a request having the key in the sample request listed above. We base64 decode it as follows:

```
Base64Decode(Q0MtUlNBLVNIQTI1Ni0yOzE1MDExOTE2MDA7Nm
E4OTBlODZmZTQ5ZWNmZDkyNWYyYzdlNGRlMTAzMWU7QUlkU
DhXLysxVlYvNVBHdzN2M1g3NVVXK1dxcHZsQkRzeHFYN203Tm02
Y2cwcWhPMjdPUm1IVnhaaC81U1oyN1dBa2d1ZTIzdk1JcFVZMVp4
cktPOTVuQWEzZW1jRWdkUVJvRUFGS3RId3llYjZBTWFsQjZKL1hL
WUFjY1E5Wk1Yb0N4YnZERm5MKzlNeXVEZWFtNVFGUEUycFZVS
1FnSFNkQVU3alcrVWVpRkFJZFRMZ1Q5WHh4c0NzbS95ZlBSd1ZW
QWZuU2RrS3N4Y1pqa3J4Tjc0eGFmZmd5Z2J6NVh5WTN0VVRQOG
40YnVPR1ZJaU13NmJabzNNMmFjcXVsc1BMRnFRa1N4VGM3MkdT
ckJuNEt5YmRkL2U0S3hiV0t4aHl6Nkh5dkpVU2FHcEZhcXgxejJiS1Boa
HF4UngzbnZQQTVCSVgvSTVRV2FvMU1WN1NONU9RPT07VGVzdF
NlcnZpY2U=)
```

The decoding step in the foregoing example provides the following information, which includes the signature:

```
CC-RSA-SHA256-2;
1501191600;
6a890e86fe49ecfd925f2c7e4de1031e;
AIdP8W/+1VV/5PGw3v3X75UW+WqpvlBDsxqX7m7Nm6cg0qhO27O
RmHVxZh/5SZ27WAkgue23vMIpUY1ZxrKO95nAa3emcEgdQRoEAFK
tHwyeb6AMalB6J/XKYAccQ9ZMXoCxbvDFnL+9MyuDeam5QFPE2pV
UKQgHSdAU7jW+UeiFAIdTLgT9XxxsCsm/yfPRwVVAfnSdkKsxcZjkrx
N74xaffgygbz5XyY3tUTP8n4buOGVIiMw6bZo3M2acqulsPLFqQkSxTc7
2GSrBn4Kybdd/e4KxbWKxhyz6HyvJUSaGpFaqx1z2bKPhhqxRx3nvPA5
BIX/I5QWao1MV7SN5OQ==;TestService
``` where CC-RSA-SHA256-2 is the signature version, 1501191600 is the (Unix) timestamp, 6a890e86fe49ecfd925f2c7e4de1031e is the random nonce value, and the service name is TestService.

The solution disclosed herein offers several advantages over conventional methods for authenticating API requests. All of the components or services have their own key pair consisting of a public key and private key. Consequently, all of the services can verify the identity of each of the other services with which they communicate or interact, without revealing their own private keys. They also can ensure that no service or component is fraudulently impersonating any other service or component.

An further advantage of the signed API requests disclosed herein is that they can be used as an authorization system where only the caller entity (e.g. Service A in the sequence diagram of FIG. 3) needs to be registered with the central Trust authority. The callee (Service B in FIG. 3) can use a local client library to do all the necessary validation operations described herein, and does not need to be registered.

Also, the signed API requests disclosed herein will include signing algorithm version information, which the callee reads when validating the request. Minimum and maximum supported versions are retrieved from the central Trust service. Signed requests include a timestamp corresponding to its creation/signing date and time. The callee can then enforce an expiration date and time based on a predefined maximum clock skew. The signed requests can further include a cryptographically secure nonce value that the callee can cache for a predefined time interval to ensure that signatures are not reused. A further advantage is that the solution is standards-based insofar as requests are signed using only standardized or highly popular algorithms and encodings, including RSA, Sha256, Base64, and Unix timestamps. Finally, the system supports single and multi-tenancy. In other words, the RSA keys used for signing the requests may be associated with a single or multiple entities.

The presently disclosed solution may be embodied in other specific forms without departing from its spirit or essential characteristics. The described embodiments are to be considered in all respects only as illustrative and not restrictive. The scope of the disclosure is, therefore, indicated by the appended claims rather than by this detailed description. All changes which come within the meaning and range of equivalency of the claims are to be embraced within their scope.

We claim:

1. A method, comprising:
   receiving, by a computing device, a request for computing resources from a client device, the request including a digital signature and signature version information, the signature version information being separate from the digital signature and including a value;
   validating, by the computing device, the signature version information of the received request based on a comparison of the value of the signature version information with a range of signature values, the range of signature values indicative of requests from client devices authorized to communicate with the computing device; and
   providing, by the computing device, the client device with access to the computing resources in response to validation of the signature version information and validation of the signature version information.

2. The method according to claim 1, further comprising decoding, by the computing device, the request to read the signature version information, the request being decoded with use of a public key.

3. The method according to claim 2, wherein the signature version information is read from a header of the request.

4. The method according to claim 1, further comprising comparing, by the computing device, a pseudo-random number of the received request with a data cache to determine validity of the received request, the data cache including at least one pseudo-random number previously used within a computing system that includes the computing device.

5. The method according to claim 1, further comprising ignoring, deleting or archiving the request, by the computing device, in response to the value of the signature version being outside the range of signature values.

6. A computing device, comprising:
a memory; and
a processor coupled to the memory and configured to:
   receive a request for computing resources from a client device, the request including a digital signature and signature version information, and the signature version information being separate from the digital signature and including a value;
   validate the signature version information of the received request based on a comparison of the value of the signature version information with a range of signature values, the range of signature values indicative of requests from client devices authorized to communicate with the computing device; and
   provide the client device with access to the computing resources in response to validation of the signature version information and verification of the digital signature with a public key.

7. The computing device according to claim 6, wherein the processor is further configured to decode the request to read the signature version information, the request being decoded with use of a public key.

8. The computing device according to claim 6, wherein the signature version information is read from a header of the request.

9. The computing device according to claim 6, wherein the processor is further configured to ignore, delete or archive the request in response to the signature version value specified in the signature version information being outside the range signature values.

\* \* \* \* \*